(12) United States Patent
Iwanaga et al.

(10) Patent No.: US 9,342,880 B2
(45) Date of Patent: May 17, 2016

(54) DEFECT ANALYZING APPARATUS, SUBSTRATE PROCESSING SYSTEM, DEFECT ANALYZING METHOD AND COMPUTER-READABLE STORAGE MEDIUM

(71) Applicant: Tokyo Electron Limited, Tokyo (JP)

(72) Inventors: Shuji Iwanaga, Koshi (JP); Tadashi Nishiyama, Koshi (JP); Hiroshi Tomita, Koshi (JP); Izumi Hasegawa, Koshi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 0 days.

(21) Appl. No.: 14/534,414

(22) Filed: Nov. 6, 2014

(65) Prior Publication Data

US 2015/0125068 A1    May 7, 2015

(30) Foreign Application Priority Data

Nov. 7, 2013    (JP) .................................. 2013-231300

(51) Int. Cl.
G06K 9/00    (2006.01)
G06T 7/00    (2006.01)

(52) U.S. Cl.
CPC ..... *G06T 7/0004* (2013.01); *G06T 2207/30148* (2013.01)

(58) Field of Classification Search
USPC ....................................................... 382/149
See application file for complete search history.

(56) References Cited

U.S. PATENT DOCUMENTS

| 6,171,737 | B1 * | 1/2001 | Phan ..................... G03F 7/7065 257/E21.525 |
| 6,413,145 | B1 * | 7/2002 | Pinson, II ......... H01L 21/67161 451/21 |
| 6,887,124 | B2 * | 5/2005 | Pinson, II ......... H01L 21/67161 451/339 |
| 2005/0284844 | A1 * | 12/2005 | Hattori ..................... C11D 7/06 216/88 |
| 2010/0014083 | A1 * | 1/2010 | Ueno .................. G01N 21/9501 356/364 |

FOREIGN PATENT DOCUMENTS

| JP | 06-176995 A | 6/1994 |
| JP | 07-066114 A | 3/1995 |
| JP | 11-045919 A | 2/1999 |
| JP | 2008-135583 A | 6/2008 |
| JP | 2013-098476 A | 5/2013 |

* cited by examiner

*Primary Examiner* — Wesley Tucker
(74) *Attorney, Agent, or Firm* — Pearne & Gordon LLP (57) ABSTRACT

A potential trouble can be in advance suppressed by analyzing a defect of a wafer. A defect analyzing apparatus of analyzing a defect of a substrate includes an imaging unit configured to image target substrates; a defect feature value extracting unit configured to extract a defect feature value in a surface of the substrate based on the substrate image; a defect feature value accumulating unit configured to calculate an accumulated defect feature value with respect to the substrates to create an accumulation data AH; a defect determination unit configured to determine whether the accumulated defect feature value exceeds a preset critical value; and an output display unit configured to output a determination result from the defect determination unit.

12 Claims, 9 Drawing Sheets

× HEIGHT OF 201 $\mu$m OR MORE
▲ HEIGHT OF 151 TO 200 $\mu$m
□ HEIGHT OF 101 TO 150 $\mu$m
○ HEIGHT OF 51 TO 100 $\mu$m
● HEIGHT OF 1 TO 50 $\mu$m

DEFECT ANALYZING APPARATUS, SUBSTRATE PROCESSING SYSTEM, DEFECT ANALYZING METHOD AND COMPUTER-READABLE STORAGE MEDIUM

CROSS-REFERENCE TO RELATED APPLICATION

This application claims the benefit of Japanese Patent Application No. 2013-231300 filed on Nov. 7, 2013, the disclosures of which are incorporated herein by reference.

TECHNICAL FIELD

The embodiments described herein pertain generally to a defect analyzing apparatus of analyzing a defect of a substrate based on a substrate image, a substrate processing system including the defect analyzing apparatus, a defect analyzing method of analyzing the defect of the substrate, and a computer-readable storage medium.

BACKGROUND

By way of example, in a photolithography process of a semiconductor device manufacturing process, a series of processes including a resist coating process of coating a resist liquid onto a wafer to form a resist film, an exposure process of exposing the resist film to a preset pattern, and a developing process of developing the exposed resist film is performed in sequence, so that a preset resist pattern is formed on the wafer. The series of processes is performed in a coating and developing system as a substrate processing system including various processing units configured to process the wafer and a transfer device configured to transfer the wafer.

One of defects occurring on the wafer processed in the coating and developing system is a defocus defect caused by a defocus during the exposure process. The main cause of the defocus defect is that a stage of an exposure apparatus is contaminated with particles. The contamination of the stage is caused by particles adhering to, in particular, a rear surface of the wafer loaded into the exposure apparatus. For this reason, the wafer before being loaded into the exposure apparatus needs to have a clean rear surface.

Further, the inside of the exposure apparatus is in a high vacuum, and for example, during an operation of cleaning the contaminated stage of the exposure apparatus, the exposure apparatus is open to atmosphere, and after the cleaning operation, the exposure apparatus needs to be exhausted again to a high vacuum level. For this reason, this cleaning operation requires a lot of time and the coating and developing system cannot be operated during the cleaning operation, which is a problem in terms of productivity.

In this regard, Patent Document 1 suggests a substrate processing system including a cleaning unit configured to clean the rear surface of the wafer to keep the rear surface of the wafer loaded into the exposure apparatus clean and an inspection unit configured to image the cleaned rear surface of the wafer with an imaging device such as a CCD line sensor.

In this substrate processing system, wafers cleaned by the cleaning unit are inspected by the inspection unit, and only wafers, which are confirmed as having particles in a tolerance range, are loaded into the exposure apparatus. Thus, it is possible to reduce defocus defect and contamination of the stage.

Patent Document 1: Japanese Patent Laid-open Publication No. 2008-135583

However, even if only the wafers, which are confirmed as having particles in the tolerance range after being cleaned by the cleaning unit and inspected by the inspection unit, are loaded into the exposure apparatus, a defocus defect may still occur.

In this regard, the present inventors assumed that a cause of the defocus defect is that multiple wafers having particles in the tolerance range are repeatedly transferred so that the particles are gradually deposited at the same position on the stage and grow to an intolerable size.

In order to avoid the defocus defect caused by the deposition of particles in the tolerance range, for example, it is considered to more strictly set the tolerance range of particles. However, in this case, even wafers, which have conventionally undergone the exposure process without any problems, cannot pass this inspection, and, thus, it is not practical. Therefore, the present inventors assumed that it is possible to reduce the defocus defects caused by the particle growth if a tendency of defects which include particles and occur in a surface of the wafer is cumulatively checked and particles are suppressed from being continuously deposited, for example, at the same position on the stage.

SUMMARY

In view of the foregoing, example embodiments are provided to suppress potential troubles in advance by analyzing defects of a wafer.

In one example embodiment, a defect analyzing apparatus that analyzes a defect of a substrate includes an imaging unit configured to image target substrates; a defect feature value extracting unit configured to extract a defect feature value in a surface of the substrate based on the substrate image; a defect feature value accumulating unit configured to calculate an accumulated defect feature value with respect to the substrates; a defect determination unit configured to determine whether the accumulated defect feature value exceeds a preset critical value; and an output display unit configured to output a determination result from the defect determination unit.

In accordance with the example embodiment, by providing the defect feature value extracting unit configured to extract a defect feature value and the defect feature value accumulating unit configured to accumulate the defect feature value, it is possible to obtain a tendency of accumulated defects occurring in the surface of the substrate. Further, since a determination result from the defect determination unit is outputted through the output display unit, it is possible to adjust relative positions between the substrate and a stage in order for particles as defects not to be deposited at the same positions on the stage based on this output, for example, in an exposure apparatus. Thus, it is possible to suppress potential troubles in advance. Furthermore, since a position where the accumulated defect feature value increases is intensively cleaned by, for example, a cleaning unit, it is possible to suppress particles as defects from being introduced into the exposure apparatus and deposited at the same positions on the stage. Thus, it is possible to suppress potential troubles in advance.

In accordance with the example embodiment, the defect feature value may be at least any one of a defect height or a defect width.

In accordance with the example embodiment, the defect feature value accumulating unit may calculate the accumulated defect feature value with respect to each of the same coordinates on the substrates, and the defect determination unit may determine whether at least any one of an defect occurrence frequency at each of the same coordinates, the accumulated defect height, or an accumulated defect width exceeds the preset critical value.

In accordance with the example embodiment, the defect analyzing apparatus may further include a storage unit configured to previously store correlation data between a cause of the defect and the defect feature value, and when the accumulated defect feature value exceeds the preset critical value, the defect determination unit may compare the accumulated defect feature value with the correlation data stored in the storage unit to determine the cause of the defect.

In another example embodiment, a substrate processing system having the defect analyzing apparatus includes a rear surface cleaning apparatus configured to clean a rear surface of the substrate; a substrate transfer device configured to transfer the substrate between the defect analyzing apparatus and the rear surface cleaning apparatus; and a controller configured to control the rear surface cleaning apparatus to clean the rear surface of the substrate in the rear surface cleaning apparatus based on the defect analysis result from the defect analyzing apparatus.

In accordance with the another example embodiment, the controller may control the rear surface cleaning apparatus to clean a position where the accumulated defect feature value is determined to exceed the preset critical value in the defect determination unit.

In accordance with the another example embodiment, the defect analyzing apparatus may perform a defect analysis on the substrate after a cleaning process is performed on the substrate in the rear surface cleaning apparatus, and the rear surface cleaning apparatus may perform the cleaning process on the rear surface of the substrate based on the defect analysis result performed by the defect analyzing apparatus after the substrate is cleaned by the rear surface cleaning apparatus.

In accordance with the another example embodiment, the substrate processing system may further include an exposure transfer device configured to transfer the substrate with respect to a stage of an exposure apparatus provided outside the substrate processing system, and the exposure transfer device may adjust relative positions between the stage and the substrate mounted on the stage based on the defect analysis result performed by the defect analyzing apparatus.

In yet another example embodiment, a substrate processing system having the defect analyzing apparatus may include a processing apparatus configured to mount the substrate on an upper surface of a substrate holding unit that is provided in the processing apparatus and has multiple protrusions, and configured to perform a preset process on the held substrate; and a substrate transfer device configured to transfer the substrate with respect to the processing apparatus. The substrate transfer device may adjust relative positions between the substrate holding unit of the processing apparatus and the substrate mounted on the substrate holding unit based on the defect analysis result from the defect analyzing apparatus.

In still another example embodiment, a defect analyzing method of analyzing a defect of a substrate includes imaging target substrates; extracting a defect feature value in a surface of the substrate based on the substrate image; calculating an accumulated defect feature value with respect to the substrates; determining whether the accumulated defect feature value exceeds a preset critical value; and outputting a defect determination result to a preset output display unit.

In accordance with the still another example embodiment, the defect feature value may be at least any one of a defect height or a defect width.

In accordance with the still another example embodiment, the calculating of the accumulated defect feature value may be carried out with respect to each of the same coordinates on the substrates, and the determining of whether the accumulated defect feature value exceeds the preset critical value may be carried out by determining whether at least any one of a defect occurrence frequency at each of the same coordinates, the accumulated defect height, and the accumulated defect width exceeds the preset critical value.

In accordance with the still another example embodiment, the defect analyzing method may further includes storing correlation data between a cause of the defect and the defect feature value in advance, and when the accumulated defect feature value exceed the preset critical value, the accumulated defect feature value may be compared with the correlation data to determine the cause of the defect.

In a yet still another example embodiment, a program to be executed in a computer of a controller may control a substrate analyzing apparatus to perform the defect analyzing method by the defect analyzing apparatus.

In a further still another example embodiment, a computer-readable storage medium may be stored thereon computer-executable instructions that, in response to execution, cause a substrate processing system to perform a defect analyzing method.

In accordance with the example embodiments, it is possible to suppress potential troubles in advance by analyzing the defect of the wafer.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Figure 1:
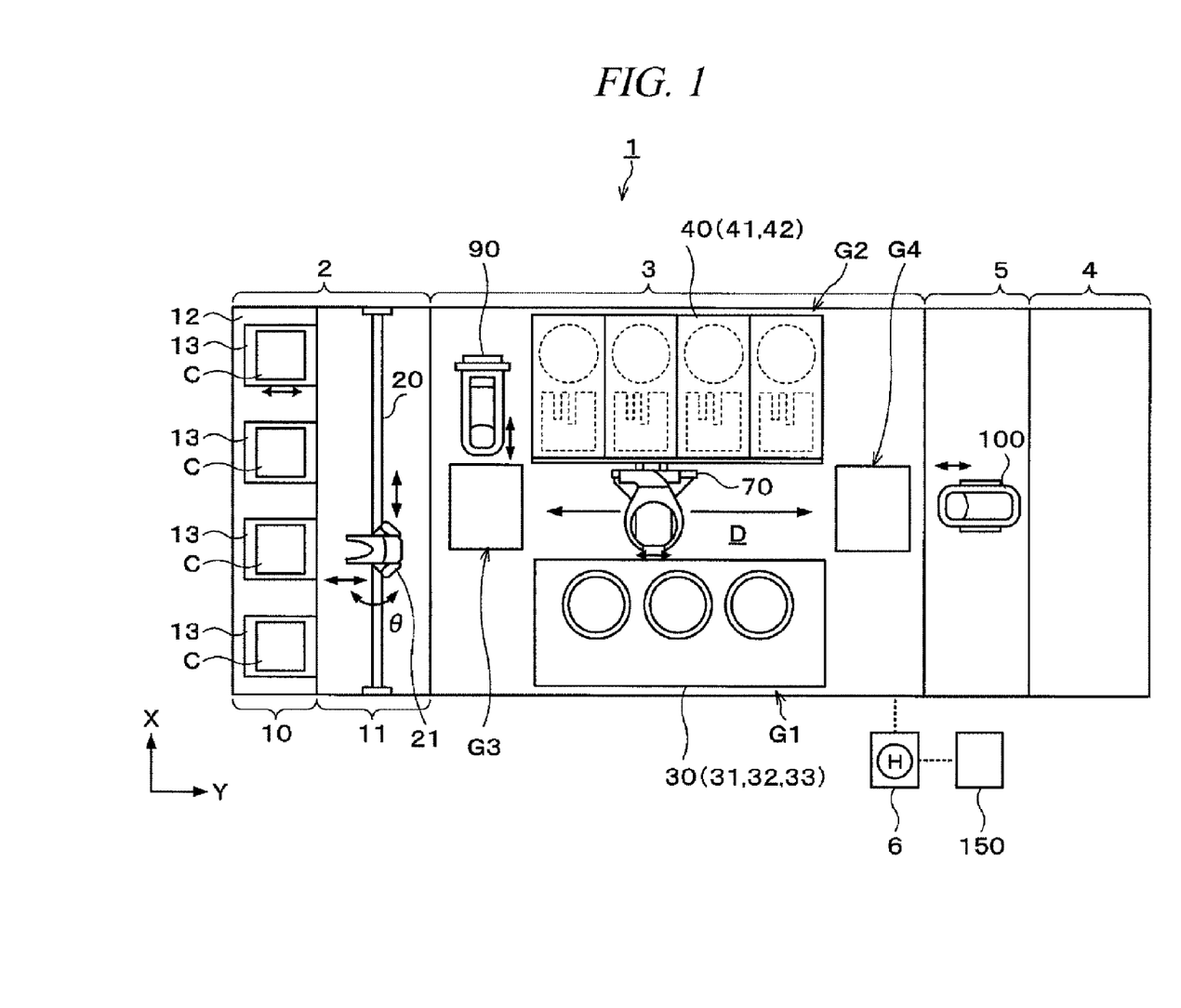
FIG. 1 is a plane view schematically illustrating an internal configuration of a substrate processing system in accordance with an example embodiment.
Figure 2:
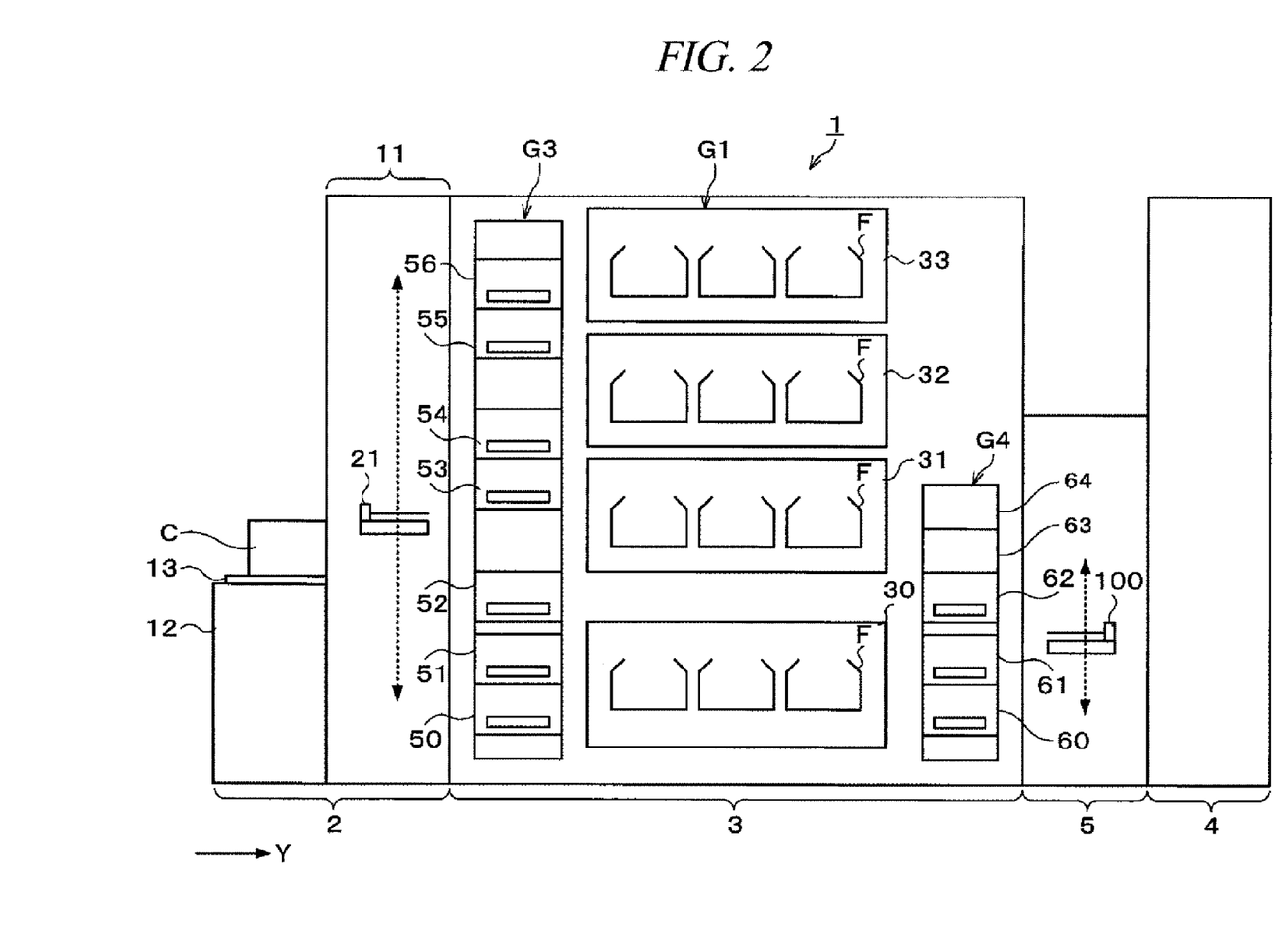
FIG. 2 is a side view schematically illustrating the internal configuration of the substrate processing system in accordance with the present example embodiment.
Figure 3:
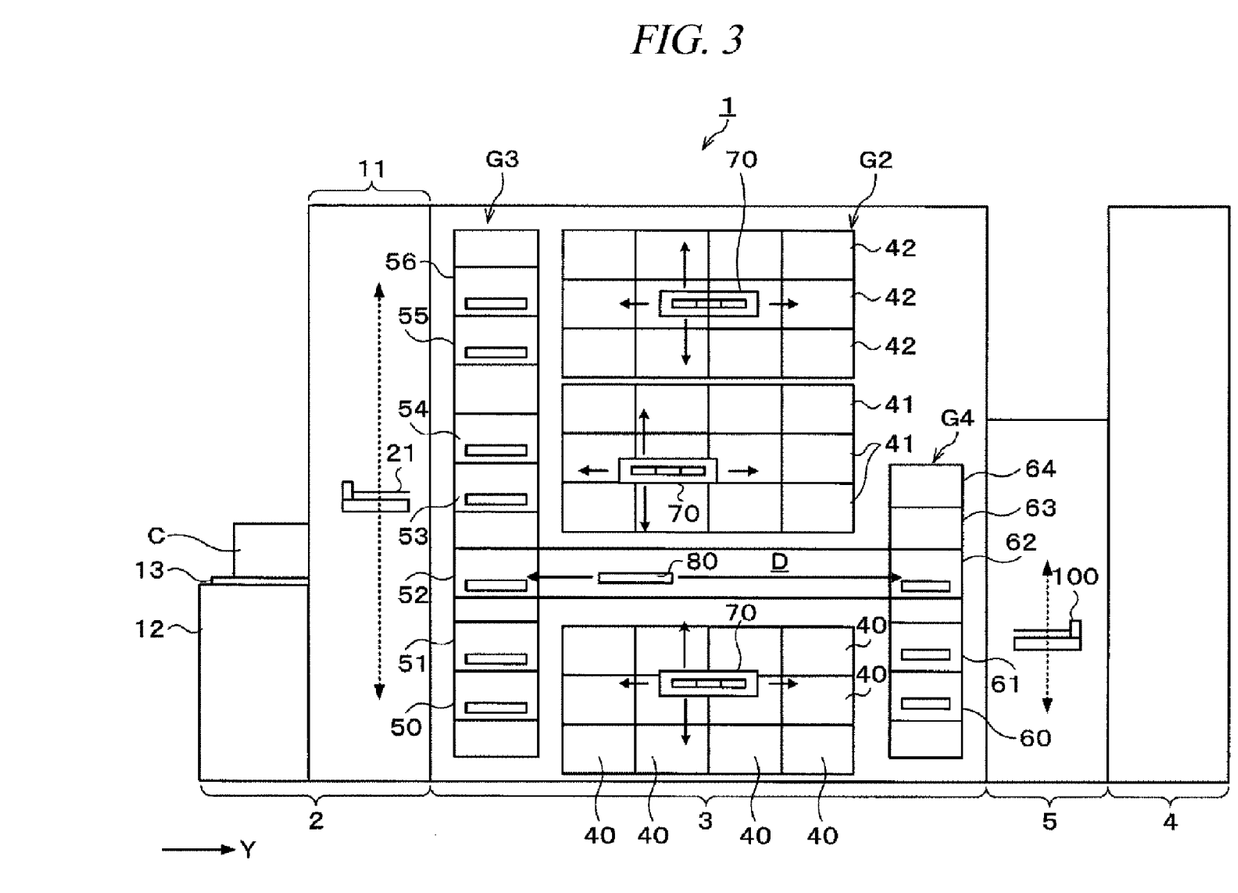
FIG. 3 is a side view schematically illustrating the internal configuration of the substrate processing system in accordance with the present example embodiment.

Hereinafter, example embodiments will be described. FIG. 1 is an explanatory diagram schematically illustrating an internal configuration of a substrate processing system 1 including a defect analyzing apparatus in accordance with the present example embodiment. FIG. 2 and FIG. 3 are side views each schematically illustrating the internal configuration of the substrate processing system 1. Further, in the present example embodiment, a case where the substrate processing system 1 is a coating and developing system configured to perform, for example, a photolithography process on a substrate will be described as an example.

The substrate processing system 1 has, as illustrated in FIG. 1, a configuration in which, for example, a cassette station 2 as a loading/unloading unit through which a cassette C is loaded and unloaded with respect to, for example, the outside; a process station 3 as a processing unit including various multiple processing units configured to perform preset wafer processes sheet by sheet during a photolithography process; and an interface station 5 as a transfer unit configured to deliver a wafer W to/from an exposure apparatus 4 adjacent to the process station 3, are integrally connected. The substrate processing system 1 also includes a controller 6 configured to control the substrate processing system 1.

The cassette station 2 is divided, for example, into a cassette loading/unloading unit 10 and a wafer transfer unit 11. By way of example, the cassette loading/unloading unit 10 is provided at an end portion side of the substrate processing system 1 in a negative Y-direction (a left direction in FIG. 1).

In the cassette loading/unloading unit 10, a cassette mounting table 12 is provided. On the cassette mounting table 12, multiple, for example, four mounting plates 13 are provided. The mounting plates 13 are arranged in a line in a horizontal X-direction (a vertical direction in FIG. 1). On the mounting plates 13, cassettes C can be mounted when the cassettes C are loaded and unloaded from/to the outside of the substrate processing system 1.

In the wafer transfer unit 11, there is provided a wafer transfer device 21 which is moved on a transfer path 20 extending in the X-direction as illustrated in FIG. 1. The wafer transfer device 21 is also moved in the vertical direction and rotated around a vertical axis (in a θ-direction), and is configured to transfer the wafer W between the cassette C on each of the mounting plates 13 and a delivery unit of a third block G3 in the process station 3 to be described later.

In the process station 3, multiple, for example, four blocks G1, G2, G3, and G4 each including various units are provided. At the front side (a negative X-direction side in FIG. 1) in the process station 3, the first block G1 is provided, and at the rear side (a positive X-direction side in FIG. 1) in the process station 3, the second block G2 is provided. Further, at the cassette station 2's side (the negative Y-direction side in FIG. 1) in the process station 3, the third block G3 is provided, and at the interface station 5's side (a positive Y-direction side in FIG. 1) in the process station 3, the fourth block G4 is provided.

In the first block G1, as illustrated in FIG. 2, multiple liquid processing units, for example, a developing unit 30 configured to perform a developing process on the wafer W, a lower anti-reflection film forming unit 31 configured to form an anti-reflection film (hereinafter, referred to as a "lower anti-reflection film") under a resist film of the wafer W, a resist coating unit 32 configured to supply a resist liquid onto the wafer W to form a resist film, and an upper anti-reflection film forming unit 33 configured to form an anti-reflection film (hereinafter, referred to as an "upper anti-reflection film") on the resist film of the wafer W, are stacked in four layers in sequence from the bottom.

Each of the units 30 to 33 in the first block G1 has multiple cups F, each of which accommodates the wafer W therein during a process, in the horizontal direction and can process multiple wafers W in parallel.

In the second block G2, as illustrated in FIG. 3, heat treatment units 40 each of which performs a heat treatment or a cooling treatment on the wafer W, adhesion units 41 as hydrophobic treatment apparatuses each of which performs a hydrophobic treatment on the wafer W, and peripheral exposure units 42 each of which exposes an outer peripheral portion of the wafer W are vertically and horizontally arranged. Further, the numbers and the arrangement of the heat treatment units 40, the adhesion units 41, and the peripheral exposure units 42 can be appropriately selected.

In the third block G3, multiple delivery units 50, 51, 52, 53, 54, 55, and 56 are provided in sequence from the bottom. Further, in the fourth block G4, multiple delivery units 60, 61, and 62, a defect analyzing unit 63 as a defect analyzing apparatus configured to inspect a rear surface of the wafer W whether there is a defect, and a rear surface cleaning unit 64 configured to clean the rear surface of the wafer W before being loaded into the exposure apparatus 4 are provided in sequence from the bottom.

A wafer transfer region D is formed in a region surrounded by the first block G1 to the fourth block G4 as illustrated in FIG. 1. In the wafer transfer region D, for example, a wafer transfer device 70 is provided.

The wafer transfer device 70 has a transfer arm that is moved, for example, in the Y-direction, the forward and backward directions, the θ-direction, and the vertical direction. The wafer transfer device 70 can be moved within the wafer transfer region D and transfer the wafer W into a preset unit in the first block G1, second block G2, third block G3 and fourth block G4. By way of example, multiple wafer transfer devices 70 are vertically arranged as illustrated in FIG. 3 and can respectively transfer the wafers W into preset units in the blocks G1 to G4 at approximately the same heights as the wafer transfer devices 70.

Further, in the wafer transfer region D, there is provided a shuttle transfer device 80 which straightly transfers the wafer W between the third block G3 and the fourth block G4.

The shuttle transfer device 80 is configured to be straightly moved, for example, in the Y-direction in FIG. 3. The shuttle transfer device 80 can be moved in the Y-direction while holding the wafer W and transfer the wafer W between the delivery unit 52 in the third block G3 and the delivery unit 62 in the fourth block G4.

As illustrated in FIG. 1, a wafer transfer device 90 is provided at the positive X-direction side of the third block G3. The wafer transfer device 90 has a transfer arm that is moved, for example, in the forward and backward directions, the θ-direction, and the vertical direction. The wafer transfer device 90 can be moved up and down while holding the wafer W to transfer the wafer W into each of the delivery units in the third block G3.

In the interface station 5, an exposure transfer device 100 is provided. The exposure transfer device 100 has a transfer arm that is moved, for example, in the forward and backward directions, the θ-direction, and the vertical direction. The exposure transfer device 100 can transfer the wafer W into each of the delivery units in the fourth block G4 and the exposure apparatus 4 while holding the wafer W by the transfer arm.

Hereinafter, the configuration of the defect analyzing unit 63 will be described.

Figure 4:
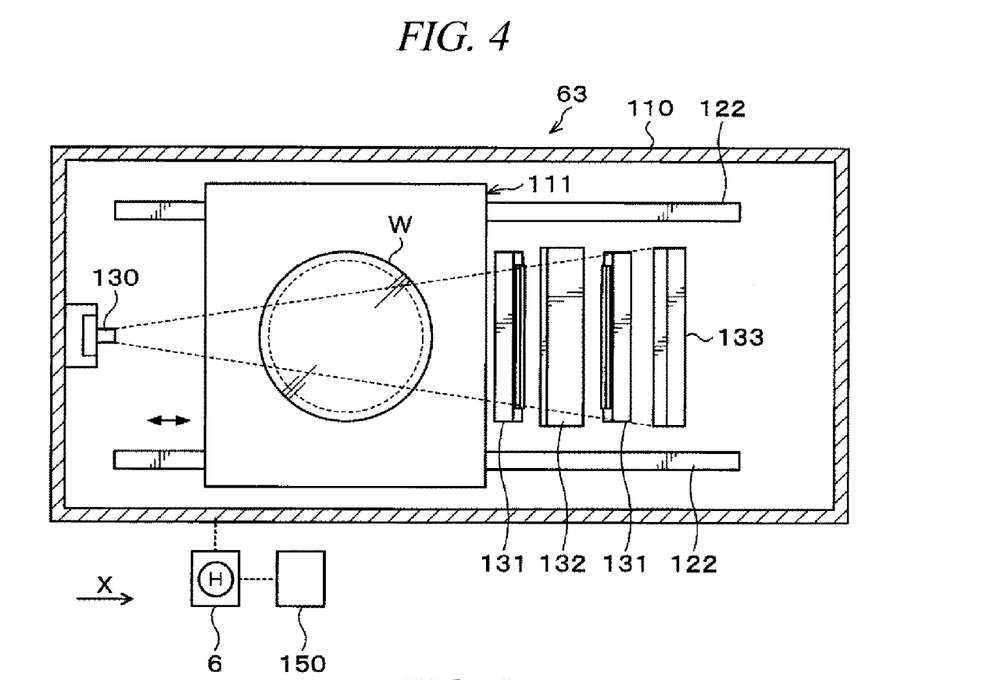
FIG. 4 is a cross-sectional view schematically illustrating a configuration of a defect analyzing unit.
Figure 5:
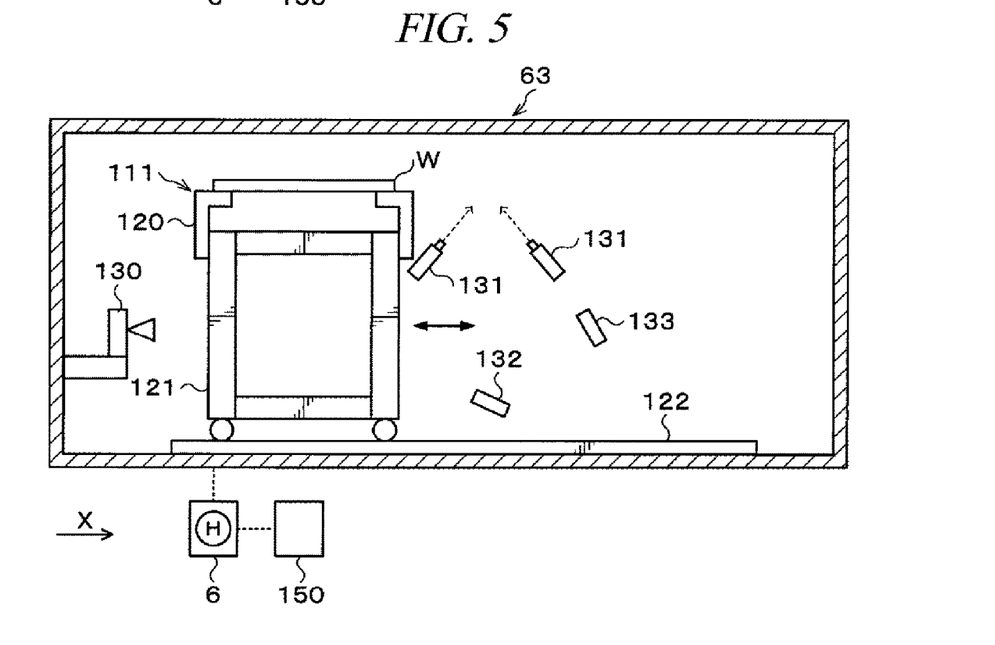
FIG. 5 is a longitudinal cross-sectional view schematically illustrating the configuration of the defect analyzing unit.

The defect analyzing unit 63 has a casing 110 as illustrated in FIG. 4. Within the casing 110, a mounting table 111 on which the wafer W is mounted is provided as illustrated in FIG. 5. The mounting table 111 has a holding member 120 configured to hold the outer peripheral portion of the wafer W with the rear surface of the wafer W facing downwards; and a supporting member 121 configured to support the holding member 120. On a bottom surface of the casing 110, there are provided guide rails 122, 122 which extend from one end side (a negative X-direction side in FIG. 5) to the other end side (a positive X-direction side in FIG. 5) within the casing 110. The supporting member 121 is configured to be moved along the guide rails 122, 122 by a non-illustrated driving device.

An imaging apparatus 130 is provided as an imaging unit on a side surface on the one end side (the negative X-direction side in FIG. 5) within the casing 110. By way of example, a wide-angle CCD camera is used as the imaging apparatus 130. There will be described a case where an image is monochrome with the number of bits of 8 (256 gradations from 0 to 255) as an example. Further, the defect analyzing unit 63 is provided with a defect analyzing device 150 configured to analyze defects based on the image of the wafer W (substrate image) captured by the imaging apparatus 130. The details of the defect analyzing device 150 will be described later.

In a region between the guide rails 122, 122 and below the wafer W held by the holding member 120, for example, two illumination devices 131, 131 are provided. The illumination devices 131, 131 are configured to irradiate an area wider than the diameter of the wafer held by the holding member 120. As the illumination devices 131, 131, for example, LEDs may be used. The illumination devices 131, 131 are arranged to face each other and irradiate an obliquely upper portion. Further, a height where optical axes of the illumination devices 131, 131 are intersected with each other is substantially the same as a height of the rear surface of the wafer W held by the holding member 120. Therefore, light beams irradiated from the illumination devices 131, 131 irradiate substantially the same position on the rear surface of the wafer W.

In a region between the guide rails 122, 122 and vertically below the position where the optical axes of the illumination devices 131, 131 are intersected, a mirror 132 is provided. The mirror 132 is provided to be inclined downwards, for example, at 22.5 degrees from a horizontal position in a direction opposite to the imaging apparatus 130. Further, in front of the imaging apparatus 130 and at a position obliquely above at 45 degrees from the mirror 132, a mirror 133 is provided. The mirror 133 is provided to be inclined downwards, for example, at 22.5 degrees from a vertical position in a direction of the bottom surface of the casing 110. For this reason, an upper position of the mirror 132 in a vertical direction is within the imaging range of the imaging apparatus 130. Accordingly, the light beams irradiated from the illumination devices 131, 131 and reflected from the rear surface of the wafer W are reflected by the mirror 132 and the mirror 133, respectively, while changing in direction by 45 degrees, and then introduced into the imaging apparatus 130. Therefore, by moving the mounting table 111 in one direction along the guide rails 122, 122 to allow the wafer W held by the mounting table 111 to be crossed above the mirror 132, the entire rear surface of the wafer W can be imaged by the imaging apparatus 130. However, the two illumination devices 131 are not necessarily provided, and arrangement and the number of the illumination devices 131 can be appropriately set as long as it is possible to adequately irradiate light beams to the rear surface of the wafer W. Furthermore, as for the mirrors 132 and 133, for example, there may be provided a mirror inclined at 45 degrees vertically below the position where the optical axes of the illumination devices 131, 131 are intersected, and arrangement and the number of the mirrors 132 and 133 can be optionally set. The captured image of the wafer W (substrate image) is inputted to the defect analyzing device 150 through the controller 6.

The controller 6 is composed of a computer including, for example, a CPU or a memory and includes a program storage unit (not illustrated). In the program storage unit, programs for implementing preset operations in the substrate processing system 1, i.e., application of a resist liquid to the wafer W, development, heat treatment, delivery of the wafer W, control of the units by controlling the operations of the above-described various processing units and the transfer devices are stored. Further, the programs may be stored, for example, in a computer-readable storage medium H such as a hard disk (HD), compact disk (CD), magneto-optical disk (MO) or memory card and installed from the storage medium H into the controller 6.

Figure 6:
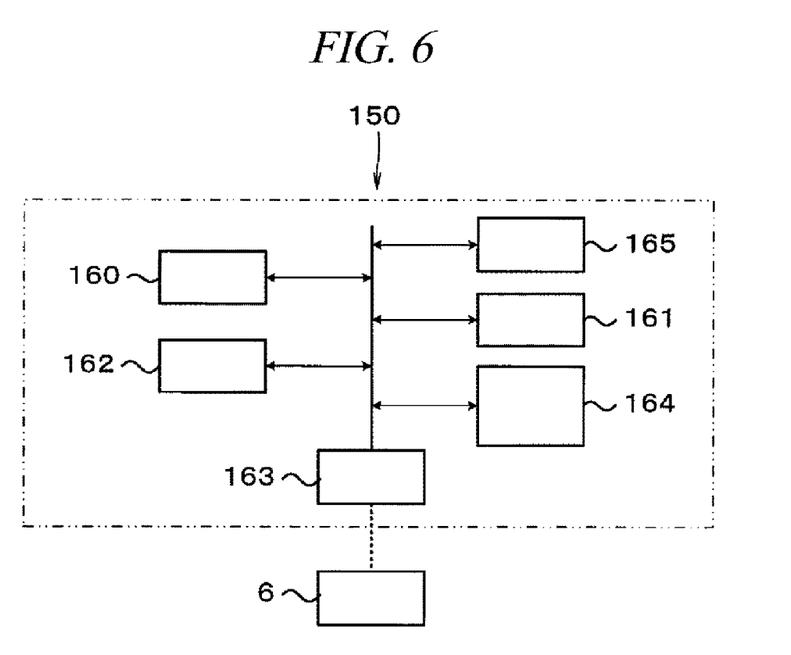
FIG. 6 is an explanatory diagram schematically illustrating a configuration of a defect analyzing apparatus.

Hereinafter, the configuration of the defect analyzing device 150 configured to analyze defects based on the substrate image will be described. The defect analyzing device 150 is composed of a general-purpose computer including, for example, a CPU and a memory. The defect analyzing device 150 includes, for example, as illustrated in FIG. 6, a defect feature value extracting unit 160 configured to extract a defect feature value in the surface of the wafer W based on the substrate image captured by the imaging apparatus 130; a defect feature value accumulating unit 161 configured to accumulate the defect feature value extracted by the defect feature value extracting unit 160 for each of multiple wafers W and calculate an accumulated defect feature value in which the defect feature values for the wafers W are added up; a defect determination unit 162 configured to determine whether or not the accumulated defect feature value calculated by the defect feature value accumulating unit 161 exceed a preset critical value; a communication unit 163 configured to input and output various kinds of information to and from the controller 6; and an output display unit 164 configured to display output of the substrate image or output the defect determination value from the defect determination unit 162.

Figure 7:
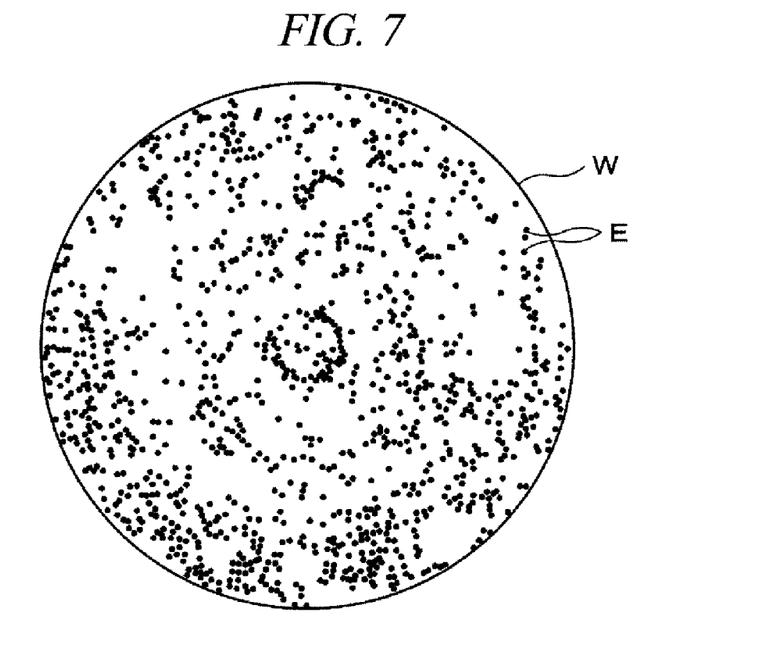
FIG. 7 is a defect distribution diagram showing positions, where defects are specified by a defect feature value extracting unit, as dots.

The defect feature value extracting unit 160 is configured to digitize the substrate image inputted from the controller 6 into the defect analyzing device 150 as pixel values, for example, in a pixel unit. Further, the defect feature value extracting unit 160 is further configured to compare each pixel in the surface of the wafer W with a preset value and specify a pixel, which exceeds the preset value, as a defective pixel in which a defect is found in the wafer W. Further, a region where defective pixels are continuously distributed is specified as a single defect (a defective region), and a feature value is extracted from the defective region. FIG. 7 is an explanatory diagram of an example of a diagram (defect distribution diagram) showing positions, which are specified as the defective region E by the defect feature value extracting unit 160, as dots. A defect feature value may include, for example, a defect height or a defect width. By way of example, a defect width as the defect feature value can be obtained based on an area of the defective region of the continuous defective pixels and a correlation between an area of a defective pixel and the actual defect width, which are previously obtained by a test. Further, in the same manner, a defect height can be obtained based on a pixel value of each pixel in the defective region and a correlation between a pixel value of a defective pixel and the actual defect height, which are previously obtained by a test. Although each defective region E is simply expressed as a dot in FIG. 7, the defect feature value extracting unit 160 obtains a defect feature value from each defective region E.

Figure 8:
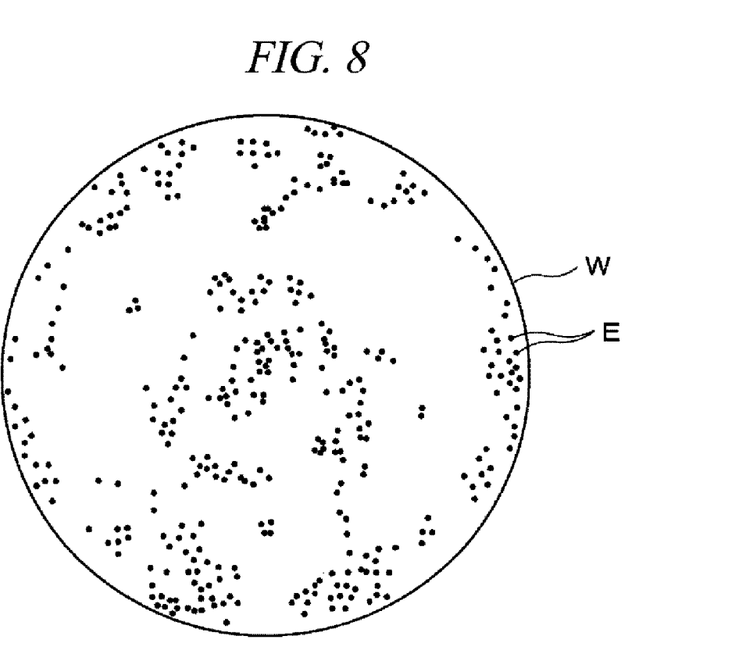
FIG. 8 is a defect distribution diagram showing positions, where defects are specified by the defect feature value extracting unit, as dots.
Figure 9:
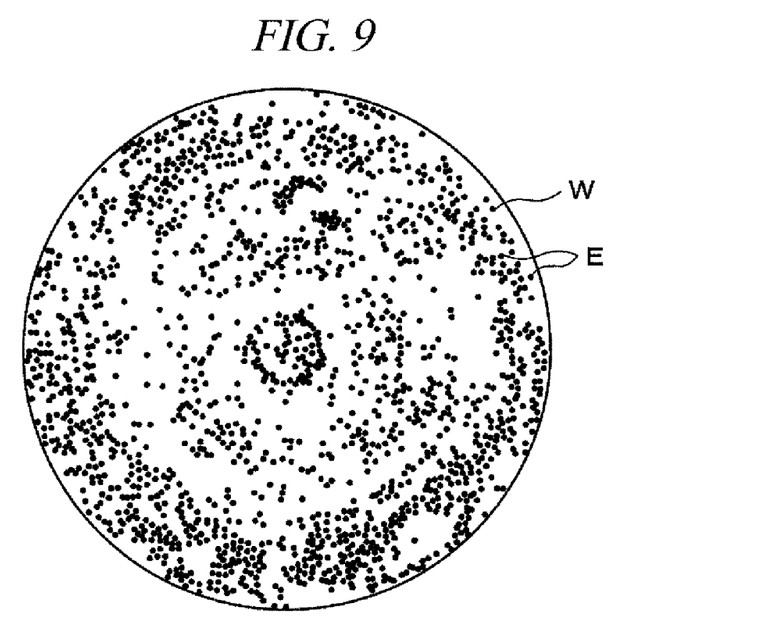
FIG. 9 is a defect distribution diagram showing positions, where defects are specified by the defect feature value extracting unit, as dots.
Figure 10:
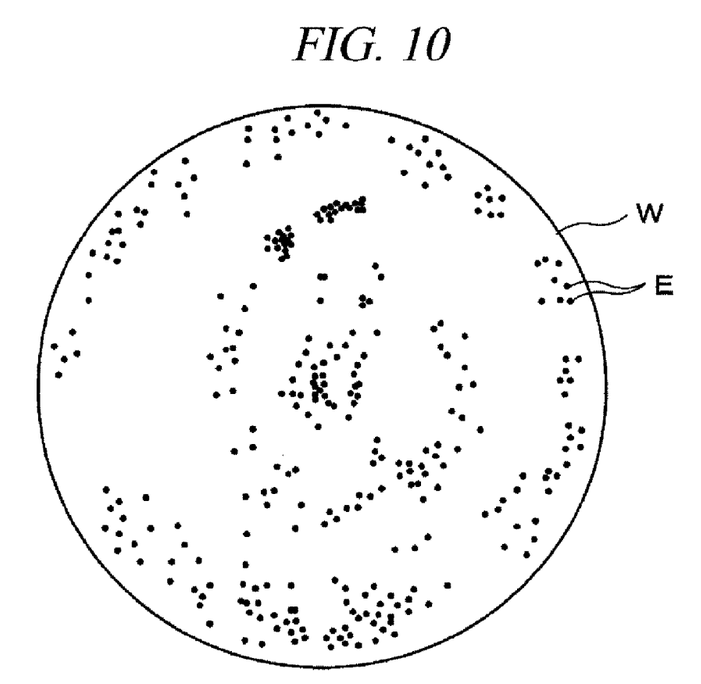
FIG. 10 is a defect distribution diagram showing positions, where defects are specified by the defect feature value extracting unit, as dots.
Figure 11:
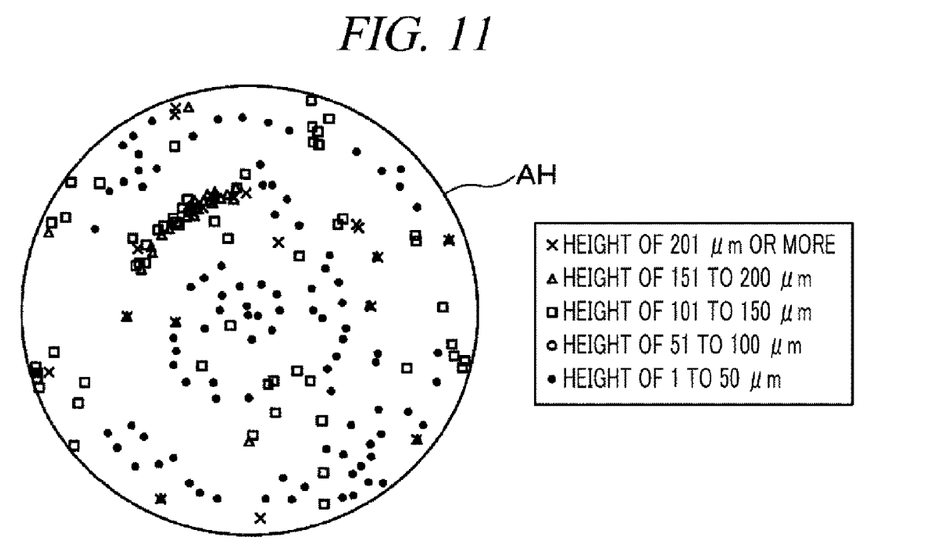
FIG. 11 is an explanatory diagram showing accumulation data when a defect feature value is a defect height.
Figure 12:
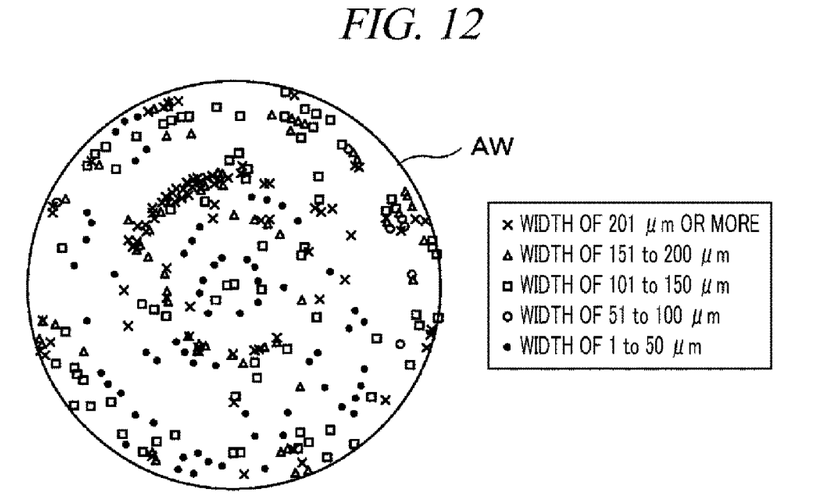
FIG. 12 is an explanatory diagram showing accumulation data when a defect feature value is a defect width.
Figure 13:
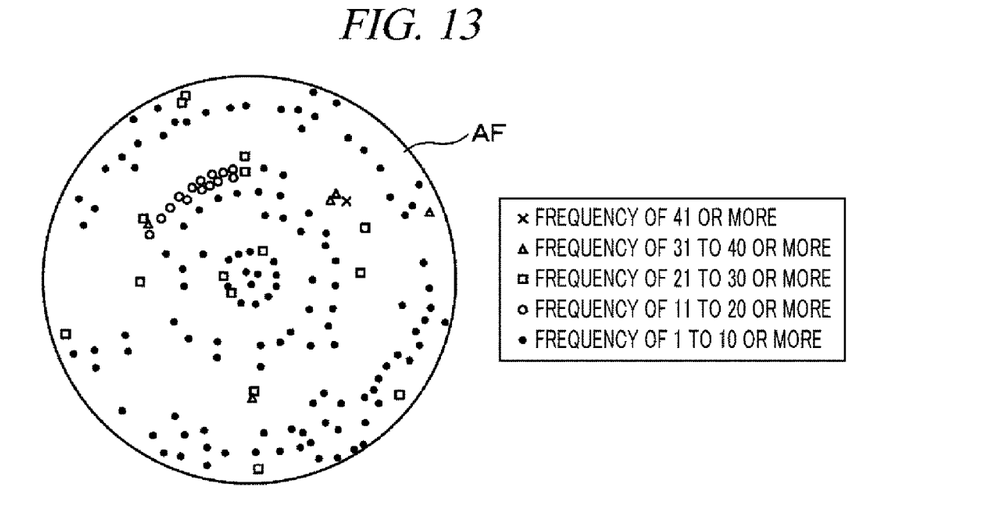
FIG. 13 is an explanatory diagram showing accumulation data when a defect feature value is a defect occurrence frequency.

In the defect feature value accumulating unit 161, for example, defect distribution diagrams of other wafers W as illustrated in FIG. 8 to FIG. 10 are obtained as well as the defect distribution diagram as illustrated in FIG. 7. Further, accumulated defect feature values from the defect distribution diagrams of the multiple wafers W are calculated, and new accumulation data AH, AW, and AF are created, for example, as illustrated in FIG. 11, FIG. 12, and FIG. 13. The accumulation data AH, AW, and AF will be described.

By way of example, in the accumulation data AH, AW, and AF, the defect feature values from the defect distribution diagrams of the multiple wafers W are accumulated with respect to each of the respectively corresponding pixels, and the accumulated defect feature values are plotted in the surface of the wafer W. FIG. 11 to FIG. 13 show examples of the accumulation data AH, AW, and AF created by accumulating the defect feature values with respect to, for example, 50 wafers W. By way of example, the data may be obtained by accumulating the defect feature values from the defect distribution diagrams of the multiple wafers W, for example, 50 wafers W in the present example embodiment, with respect to each pixel at the same coordinates in the 50 wafers W. FIG. 11 shows accumulation data AH obtained by accumulating the defect heights, as the defect feature values, with respect to each pixel at the same coordinates in each wafer W. In FIG. 11, "Δ" denotes a pixel having an accumulation value of 201 μm or more as a result of accumulating the defect heights, as defect feature values, with respect to 50 wafers W. Further, in FIG. 11, "▲" denotes a pixel having an accumulation value of 151 μm to 200 μm, "□" denotes a pixel having an accumulation value of 101 μm to 150 μm, "○" denotes a pixel having an accumulation value of 51 μm to 100 μm, "• (dot)" denotes a pixel having an accumulation value of 1 μm to 50 μm.

Further, in the accumulation data AH, for example, an accumulation value of the defect feature values when the defect height of 10 μm is found in five wafers W of the 50 wafers W is the same as an accumulation value of the defect feature values when the defect height of 50 μm is found in only one wafer W of 50 wafers W.

FIG. 12 shows accumulation data AW obtained by accumulating the defect widths, as the defect feature values, with respect to each pixel at the same coordinates in the wafers W. As shown in FIG. 11, FIG. 12 shows accumulation values of the defect widths as respectively corresponding symbols. Further, in the accumulation data AW like the accumulation data AH, an accumulation value of the defect feature values when the defect width of 10 μm is found in five wafers W of 50 wafers W is the same as an accumulation value of the defect feature values when the defect width of 50 μm is found in only one wafer W of 50 wafers W.

FIG. 13 shows accumulation data AF obtained by accumulating the defect occurrence frequencies, as the defect feature values, with respect to the same pixel. The accumulation data AF are obtained by accumulating pixels, in which as the defect feature values, the defect height and the defect width exceed preset values, at the same coordinates. To be more specific, in the present example embodiment, for example, if the defective region E occurs in pixels at the same coordinates in 20 wafers W of 50 wafers W, the defect occurrence frequency is 20 as expressed by "○" in FIG. 13. This accumulating operation is carried out to all of the pixels in the surface of the wafer W, so that the accumulation data AF as shown in FIG. 13 are obtained.

In the defect feature value accumulating unit 161, the accumulation data AH, AW, and AF may be updated in sequence by, for example, creating a new defect distribution diagram whenever a substrate image is captured by the imaging apparatus 130, and accumulating the defect distribution diagram in sequence with respect to the corresponding accumulation data AH, AW, and AF. Alternatively, in the defect feature value accumulating unit 161, all defect data from the defect feature value extracting unit 160 and the individual substrate images are stored first, and then, the stored data may be used to create the accumulation data AH, AW, and AF at a certain timing. Hereinafter, there will be explained a case where the accumulation data AH, AW, and AF are updated in sequence as an example unless particularly specified otherwise.

The defect determination unit 162 is configured to determine whether or not accumulation values of the defect feature values of the respective accumulation data AH, AW, and AF exceed the respective preset critical values. By way of example, as for the accumulation data AH, assuming that a defocus defect is likely to occur in a position where the accumulation value of the defect heights is 201 μm or more since the particles as the defects are accumulatively deposited on a stage (not illustrated) of the exposure apparatus 4, two critical values of, for example, 100 μm or more and 201 μm or more may be set. Further, in the accumulation data AH, when a pixel having the accumulation value of the defect height of 100 μm or more occurs, it is determined as, for example, "high defocus risk", and when a pixel having the accumulation value of the defect height of 201 μm or more occurs, it is determined as, for example, "double high defocus risk". A determination result of the defect determination unit 162 is displayed as, for example, alarm on the output display unit 164.

Hereinafter, there will be explained an example method of using the analysis result of the defects from the defect analyzing device 150. By way of example, if a pixel having an accumulation value of a defect height of 100 μm or more occurs and "high defocus risk" is displayed on the output display unit 164, an operator who checks the output can know that particles are deposited on a certain position of the stage (not illustrated) of the exposure apparatus 4, so that the defocus is highly likely to occur. However, if an accumulation value at a certain pixel in the accumulation data AH is 100 μm or more, it is difficult to determine whether the accumulation value of the pixel is caused when the defect height of 10 μm occurs in 10 wafers W of 50 wafers W or when the defect height of 100 μm or more occurs in only one wafer W of 50 wafers W.

Therefore, for example, by comparing the accumulation data AF displayed on the output display unit 164 with the accumulation data AH, it is possible to know the defect status in a pixel having the accumulation value of the defect height of 100 μm or more. Further, by comparing the accumulation data AF with the accumulation data AH, if the defect occurrence frequency is low and the defect height is high, it can be determined as an accidental defect. Further, a case where the defect occurrence frequency is high and the defect height is also high can be determined as a reproducible defect and can also be determined that there is a factor required to improve during a process of the wafer W. Therefore, the operator can know a tendency of defects by checking the accumulation data AF and the accumulation data AH on the output display unit 164. Thus, in order to suppress defects, the operator can determine the necessary operation to be performed.

To be specific, if a reproducible defect having a high defect occurrence frequency and a high defect height occurs, for example, a process that causes the defect is specified from a position where the defect occurs. By way of example, if defects distributed in a concentric circular shape occurs in the wafer W like the accumulation data AH as shown in FIG. 11, it can be assumed that this defect occurs when the coating process is performed on the wafer W by spin coating, and the liquid processing unit is intensively inspected. Thus, it becomes easy to specify a cause of the defect.

Further, if the defect occurrence frequency is low and the defect height is high, it can be determined as an accidental defect. Thus, it is possible to specify a cause by inspecting a process in which a large defect in a height direction is likely to occur. Furthermore, if the defect occurrence frequency is low and the defect height is also low, it is not an urgent case, and it can be determined to monitor the progress thereof. Moreover, if the defect occurrence frequency is high but the defect height is low, it can be determined whether to immediately inspect the apparatus or to inspect the apparatus for specifying a cause at the same time as a regular inspection, depending on an expected defocus risk.

The substrate processing system 1 in accordance with the present example embodiment has the configuration as described above, and hereinafter, a process of the wafer W to be performed in the substrate processing system 1 configured as above will be explained.

During the process of the wafer W, the cassette C that accommodates multiple wafers W is mounted on a certain mounting plate 13 of the cassette loading/unloading unit 10. Then, each of the wafers W within the cassette C is unloaded in sequence by the wafer transfer device 21 and transferred, for example, into the delivery unit 53 in the third block G3 of the process station 3.

Then, the wafer W is transferred by the wafer transfer device 70 into the heat treatment unit 40 in the second block G2 and temperature-controlled. Thereafter, the wafer W is transferred by the wafer transfer device 70, for example, into the lower anti-reflection film forming unit 31 in the first block G1, in which a lower anti-reflection film is formed on the wafer W. The wafer W is then transferred into the heat treatment unit 40 in the second block G2 and subjected to a heat treatment. The wafer W is then returned back to the delivery unit 53 in the third block G3.

Then, the wafer W is transferred by the wafer transfer device 90 into the delivery unit 54 in the same third block G3. Thereafter, the wafer W is transferred by the wafer transfer device 70 to the adhesion unit 41 in the second block G2 and subjected to a hydrophobic treatment. The wafer W is then transferred by the wafer transfer device 70 to the resist coating unit 32, in which a resist film is formed on the wafer W. The wafer W is then transferred by the wafer transfer device 70 to the heat treatment unit 40 and subjected to a pre-baking treatment. The wafer W is then transferred by the wafer transfer device 70 to the delivery unit 55 in the third block G3.

Then, the wafer W is transferred by the wafer transfer device 70 to the upper anti-reflection film forming unit 33, in which an upper anti-reflection film is formed on the wafer W. The wafer W is then transferred by the wafer transfer device 70 to the heat treatment unit 40, and heated and temperature-controlled. The wafer W is then transferred to the peripheral exposure unit 42 and subjected to a peripheral exposure treatment.

The wafer W is then transferred by the wafer transfer device 70 to the delivery unit 56 in the third block G3.

The wafer W is then transferred by the wafer transfer device 90 to the delivery unit 52 and transferred by the shuttle transfer device 80 to the delivery unit 62 in the fourth block G4. The wafer W is then transferred by the exposure transfer device 100 in the interface station 5 to the rear surface cleaning unit 64 and subjected to a rear surface cleaning treatment. The wafer W of which the rear surface is cleaned is transferred by the exposure transfer device 100 to the defect analyzing unit 63, in which the rear surface of the wafer W is imaged.

A substrate image captured by the defect analyzing unit 63 is inputted to the defect analyzing device 150 through the controller 6 and the communication unit 163. In the defect analyzing device 150, a defect distribution diagram is sequentially created by the defect feature value extracting unit 160 based on the substrate image. In the defect feature value accumulating unit 161, the substrate image is accumulated in sequence and the accumulation data AH, AW, and AF are updated in sequence.

Further, in the defect determination unit 162, the accumulation data AH, AW, and AF are determined in sequence, and if an accumulation value exceeds a preset critical value, an alarm notifying this determination result is outputted on the output display unit 164. Then, a status of the wafer W is determined by the program in the controller 6 as being able to be exposed in the exposure apparatus 4 be as long as the accumulation value does not exceed the preset critical value, and the wafer W is transferred by the exposure transfer device 100 to the exposure apparatus 4.

Figure 14:
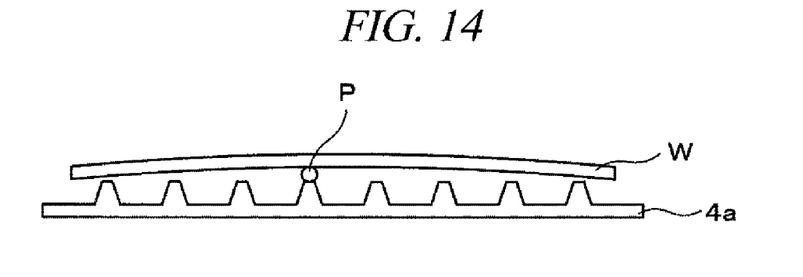
FIG. 14 is an explanatory diagram showing a positional relationship among a stage of an exposure apparatus, a wafer, and a particle.
Figure 15:
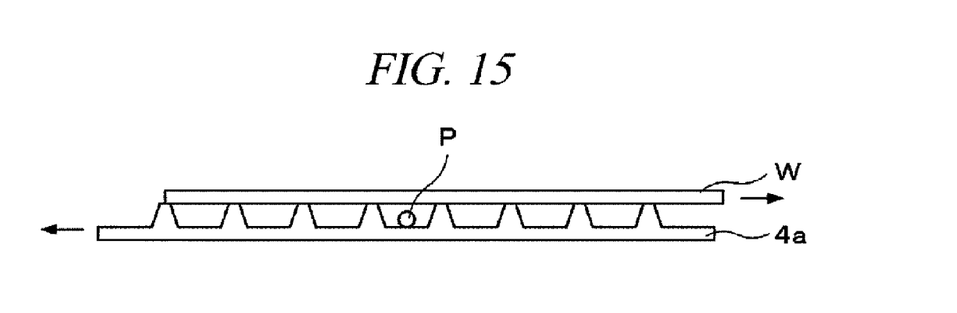
FIG. 15 is an explanatory diagram showing a positional relationship among a stage of an exposure apparatus, a wafer, and a particle.

Herein, if the accumulation value of each of the accumulation data AH, AW, and AF exceeds the preset critical value and the defect occurrence frequency is high, for example, as illustrated in FIG. 14, it is assumed that a particle P accumulatively adheres to a stage 4a of the exposure apparatus 4, so that the particle P having a certain height is deposited thereon. As shown on the stage 4a, for example, if the wafer W is mounted on an upper surface thereof including multiple protrusions, the wafer W is transferred such that relative positions between the stage 4a and the wafer W are deviated in the exposure apparatus 4. By way of example, as illustrated in FIG. 15, it is possible to suppress the defocus from occurring by avoiding adhesion of the particle P to the same position, particularly leading ends of the protrusions of the stage 4a.

Further, if the accumulation value of each of the accumulation data AH, AW, and AF exceeds the preset critical value and the defect occurrence frequency is high, for example, it is determined by the controller 6 as being unable to be exposed, and a subsequent process supposed to be performed on the wafer W may be stopped. In this case, the wafer W is transferred by the exposure transfer device 100 to the delivery unit 62 and is transferred by the shuttle transfer device 80 to the delivery unit. Then, the wafer W is transferred to the cassette station 2 and collected into the cassette C on the preset mounting plate 13.

Furthermore, if the accumulation value of each of the accumulation data AH, AW, and AF exceeds the critical value and the defect occurrence frequency is low, for example, it is determined by the controller 6 that only a wafer W corresponding to the substrate image last captured, i.e., a wafer W corresponding to the substrate image of which the accumulation value exceeds the critical value, is highly likely to have the defocus risk, and only the wafer W is transferred by the exposure transfer device 100 to the delivery unit 62 and the other wafers W are continuously transferred to the exposure apparatus 4. Further, the wafer W corresponding to the substrate image last captured is transferred again to the rear surface cleaning unit 64 to clean the rear surface thereof, and then inspected again by the defect analyzing unit 63. In this case, desirably, the cleaning treatment to the wafer W by the rear surface cleaning unit 64 is performed based on the determination result from the defect determination unit 162. To be specific, it is desirable to clean again only the position corresponding to the defect, which is determined as having the high defocus risk, or intensively clean the position.

The exposed wafer W is transferred by the exposure transfer device 100 to the delivery unit 60 in the fourth block G4. Then, the wafer W is transferred by the wafer transfer device 70 to the heat treatment unit 40 and subjected to a post-exposure baking treatment. Thereafter, the wafer W is transferred by the wafer transfer device 70 to the developing unit 30 and developed. After the developing process is finished, the wafer W is transferred by the wafer transfer device 70 to the heat treatment unit 40 and subjected to a post-baking treatment.

Thereafter, the wafer W is transferred by the wafer transfer device 70 to the delivery unit 50 in the third block G3, and then transferred by the wafer transfer device 21 in the cassette station 2 to the cassette C on the preset mounting plate 13. Thus, a series of photolithography processes ends.

In accordance with the above-described example embodiment, since the defect analyzing unit 63 includes the defect feature value extracting unit 160 configured to extract a defect feature value and the defect feature value accumulating unit 161 configured to accumulates the defect feature values with respect to multiple wafers W, it is possible to obtain an accumulated tendency of the defects occurring in the surface of the wafer W. Further, since a determination result from the defect determination unit 162 is outputted on the output display unit, based on this output, it is possible to take action such as adjusting relative positions between the wafer W and the stage 4a in order for the particle P as the defect not to be deposited at the same position on the stage 4a in the exposure apparatus 4. Thus, it is possible to suppress potential troubles in advance. Further, as for a position where the accumulation value of the defect feature values increases, it is possible to suppress the particle P as the defect from being introduced into the exposure apparatus and deposited at the same position on the stage 4a, for example, by controlling the rear surface cleaning unit 64 to intensively clean the position under the control of the controller 6. For this reason, it is possible to also suppress the potential troubles in advance.

Further, in the above-described example embodiment, the output display unit 164 outputs the accumulation data AH, AW, and AF, and alarms such as "high defocus risk" and "double high defocus risk". However, the output display unit 164 may output other information such as whether or not a defect in which a process needs to be immediately stopped by comparing the accumulation value of the defect feature values with a critical value and with the defect occurrence frequency by the defect determination unit 162.

Furthermore, for example, if a storage unit 165 configured to previously store correlation data between a defect feature value and a cause of the corresponding defect is provided in the defect analyzing device 150 as illustrated in FIG. 6, and the defect determination unit 162 determines that the defect feature value exceeds a critical value, the defect determination unit 162 assumes a cause of the defect occurrence by comparing the correlation data in the storage unit 165 with a defect feature value and, for example, the output display unit 164 may output the assumed cause. To be specific, for example, as described above, if there is a correlation between a position where the defects having the high accumulation value of the defect feature values are distributed in the concentric circular shape on in the wafer W and a coating process performed on the wafer W by the spin coating, there are stored in the storage unit 165 as correlation data between the defect feature value and a cause of the defect. Further, the defect determination unit 162 assumes that the defect is caused by, for example, the spin coating by comparing a position determined to exceed a critical value with the correlation data stored in the storage unit 165.

Figure 16:
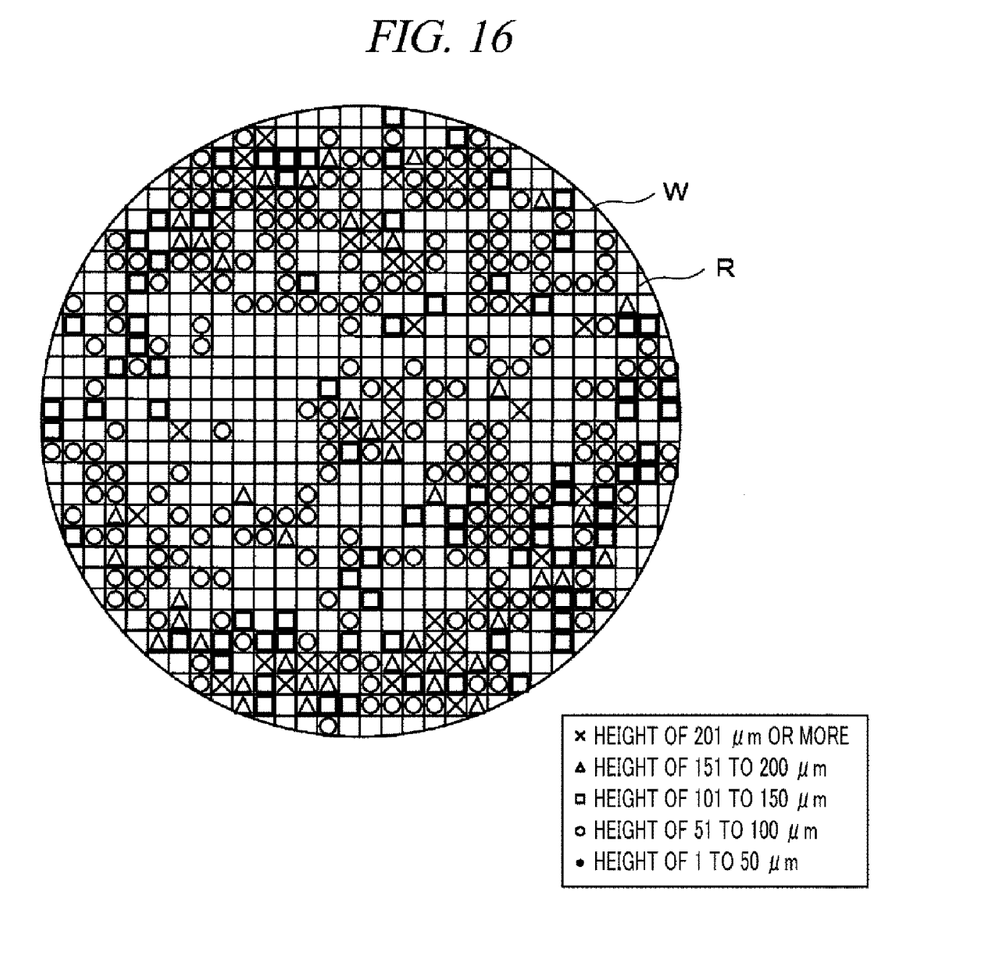
FIG. 16 is a defect distribution diagram in accordance with another example embodiment.

Further, in the above-described example embodiment, a defect feature value is determined with respect to each pixel of the substrate image. However, for example, the accumulation data AH, AW, and AF may be created or a defect determination may be made based on an average value obtained by averaging the defect feature values in pixels in a preset region. In this case, for example, as illustrated in FIG. 16, the output display unit 164 may display a determination result of a defect in each region R. Further, although the region R is set in a grid pattern in FIG. 16, the region R can be optionally set.

Furthermore, in the above-described example embodiment, there has been explained an example where relative positions between the wafer W and the stage 4a are adjusted in order for the particle P not to be deposited at the same position on the stage 4a in the exposure apparatus 4. However, this adjustment of adjusting a transfer position of the wafer W to suppress the particle P from being deposited at the same position can be applied to other processing apparatuses. By way of example, a plasma processing apparatus that performs a film forming process or an etching process on a wafer W using plasma or a bonding apparatus that performs bonding of a wafer W also includes a substrate holding unit such as an electrostatic chuck or a vacuum chuck configured to hold the wafer W on an upper surface thereof including multiple protrusions as illustrated in FIG. 14. In such a processing apparatus, it is possible to avoid troubles caused while the wafer W is bent due to the particle by adjusting relative positions between the wafer W and the substrate holding unit in the same manner as the case for the stage 4a in the exposure apparatus 4 to suppress deposition of the particle P at the same position, particularly leading ends of the protrusions on the substrate holding unit.

Although the example embodiment has been explained above, the present disclosure is not limited thereto. It is clear that various changes and modifications may be made by those skilled in the art in the scope of the present disclosure defined by the following claims, and it shall be understood that all modifications and embodiments conceived from the meaning and scope of the claims and their equivalents are included in the scope of the present disclosure. The present disclosure is not limited to the above example embodiment and can adopt various aspects. In the above example embodiment, an imaging target object is a rear surface of a substrate. However, the present disclosure can be applied to a case where a front surface of a substrate is imaged. Further, the above-described example embodiment is applied to a coating and developing system for a semiconductor wafer. However, the present disclosure can be applied to a coating and developing system for other substrates such as a FPD (flat panel display), and a mask reticle for photomask instead of a semiconductor wafer.

INDUSTRIAL APPLICABILITY

The present example embodiment is applicable to the analysis of a defect of a wafer.

We claim:

1. A defect analyzing apparatus of analyzing a defect of a substrate, the defect analyzing apparatus comprising:
    an imaging unit configured to image target substrates;
    a defect feature value extracting unit configured to extract a defect feature value in a surface of the substrate based on the substrate image;
    a defect feature value accumulating unit configured to calculate an accumulated defect feature value with respect to the substrates;
    a defect determination unit configured to determine whether the accumulated defect feature value exceeds a preset critical value; and
    an output display unit configured to output a determination result from the defect determination unit,
    wherein the defect feature value is at least any one of a defect height or a defect width, and
    the defect feature value accumulating unit is configured to update an accumulation data including at least any one of a total defect height or a total defect width, by accumulating at least any one of the defect height or the defect width of the substrate into at least any one of the total defect height or the total defect width with respect to each of the same coordinates on the substrates.

2. The defect analyzing apparatus of claim 1,
    wherein the defect feature value accumulating unit calculates the accumulated defect feature value with respect to each of the same coordinates on the substrates, and
    the defect determination unit determines whether at least any one a defect occurrence frequency at each of the same coordinates, the accumulated defect height, and the accumulated defect width exceeds the preset critical value.

3. The defect analyzing apparatus of claim 1, further comprising:
    a storage unit configured to previously store correlation data between a cause of the defect and the defect feature value,
    wherein when the accumulated defect feature value exceeds the preset critical value, the defect determination unit compares the accumulated defect feature value with the correlation data stored in the storage unit to determine the cause of the defect.

4. A substrate processing system including the defect analyzing apparatus of claim 1, the substrate processing system comprising:
    a rear surface cleaning apparatus configured to clean a rear surface of the substrate;
    a substrate transfer device configured to transfer the substrate between the defect analyzing apparatus and the rear surface cleaning apparatus; and
    a controller configured to control the rear surface cleaning apparatus to clean the rear surface of the substrate in the rear surface cleaning apparatus based on the defect analysis result from the defect analyzing apparatus.

5. The substrate processing system of claim 4,
    wherein the controller controls the rear surface cleaning apparatus to clean a position where the accumulated defect feature value is determined to exceed the preset critical value in the defect determination unit.

6. The substrate processing system of claim 4,
    wherein the defect analyzing apparatus performs a defect analysis on the substrate after a cleaning process is performed on the substrate in the rear surface cleaning apparatus, and
    the rear surface cleaning apparatus performs the cleaning process on the rear surface of the substrate based on the defect analysis result performed by the defect analyzing apparatus after the substrate is cleaned by the rear surface cleaning apparatus.

7. The substrate processing system of claim 4, further comprising:
    an exposure transfer device configured to transfer the substrate with respect to a stage of an exposure apparatus provided outside the substrate processing system,
    wherein the exposure transfer device adjusts relative positions between the stage and the substrate mounted on the stage based on the defect analysis result performed by the defect analyzing apparatus.

8. A substrate processing system including the defect analyzing apparatus of claim 1, the substrate processing system comprising:
    a processing apparatus configured to mount the substrate on an upper surface of a substrate holding unit that is provided in the processing apparatus and has multiple protrusions, and configured to perform a preset process on the held substrate; and
    a substrate transfer device configured to transfer the substrate with respect to the processing apparatus,
    wherein the substrate transfer device adjusts relative positions between the substrate holding unit of the processing apparatus and the substrate mounted on the substrate holding unit based on the defect analysis result from the defect analyzing apparatus.

9. A defect analyzing method of analyzing a defect of a substrate performed by a defect analyzing apparatus, the defect analyzing method comprising:
    imaging target substrates;
    extracting a defect feature value in a surface of the substrate based on the substrate image;
    calculating an accumulated defect feature value with respect to the substrates;
    determining whether the accumulated defect feature value exceeds a preset critical value; and outputting a defect determination result to a preset output display unit, wherein the defect feature value is at least any one of a defect height or a defect width, and the step of calculating the accumulated defect feature value comprises updating an accumulation data including at least any one of a total defect height or a total defect width, by accumulating at least any one of the defect height or the defect width of the substrate into at least any one of the total defect height or the total defect width with respect to each of the same coordinates on the substrates.

10. The defect analyzing method of claim 9, wherein the calculating of the accumulated defect feature value is carried out with respect to each of the same coordinates on the substrates, and the determining of whether the accumulated defect feature value exceeds the preset critical value is carried out by determining whether at least any one of a defect occurrence frequency at each of the same coordinates, the accumulated defect height, and the accumulated defect width exceeds the preset critical value.

11. The defect analyzing method of claim 9, further comprising:

storing correlation data between a cause of the defect and the defect feature value in advance, wherein when the accumulated defect feature value exceeds the preset critical value, the accumulated defect feature value is compared with the correlation data to determine the cause of the defect.

12. A non-transitory computer-readable storage medium having stored thereon computer-executable instructions that, in response to execution, cause a substrate processing system to perform a defect analyzing method of claim 9.

* * * * *